Feb. 19, 1957   W. J. WEISZ ET AL   2,782,405
APPARATUS FOR DETECTING MOTION IN A CONFINED SPACE
Filed May 27, 1954   3 Sheets-Sheet 1
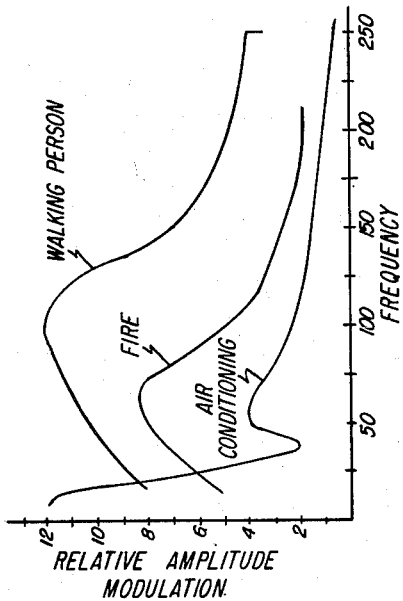
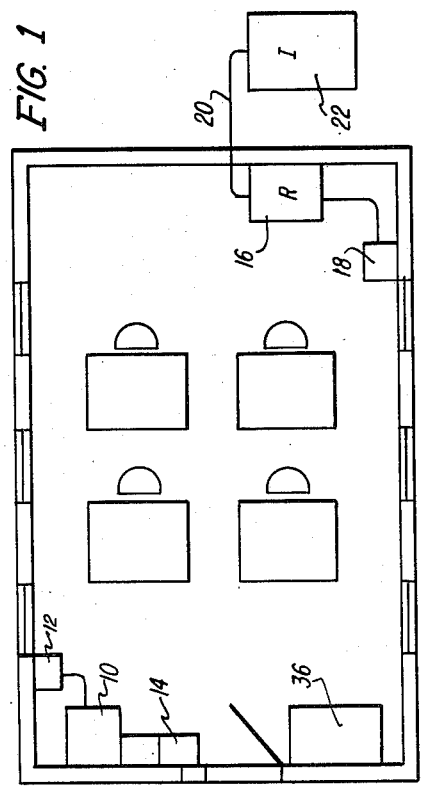
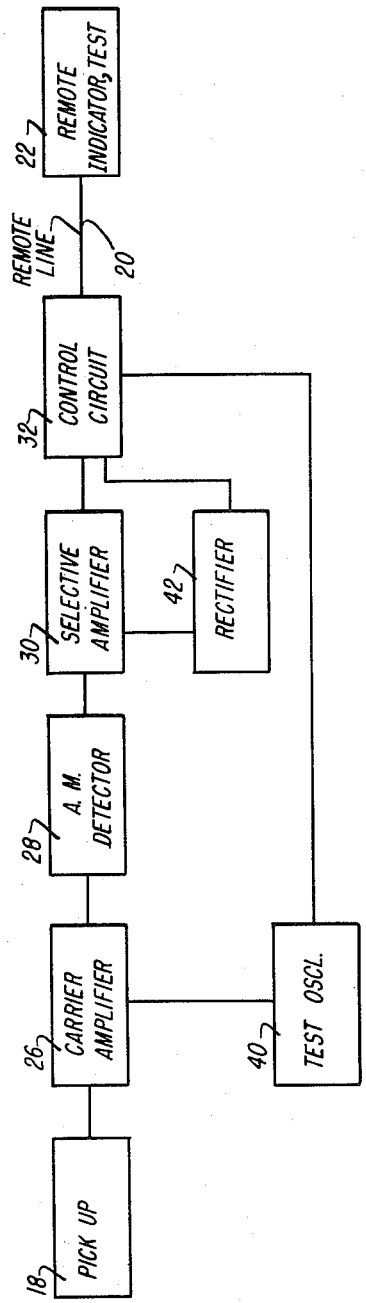
INVENTORS
William J. Weisz
BY Donald R. Jones
Mueller & Aichele
Attys.

Feb. 19, 1957  W. J. WEISZ ET AL  2,782,405
APPARATUS FOR DETECTING MOTION IN A CONFINED SPACE
Filed May 27, 1954  3 Sheets-Sheet 2

INVENTORS
William J. Weisz
Donald R. Jones
BY
Mueller & Aichele
Attys.

INVENTORS
William J. Weisz
Donald R. Jones
BY
Mueller & Aichele
Attys.

United States Patent Office 2,782,405
Patented Feb. 19, 1957

2,782,405

APPARATUS FOR DETECTING MOTION IN A CONFINED SPACE

William J. Weisz, Skokie, and Donald R. Jones, Chicago, Ill., assignors to Motorola, Inc., Chicago, Ill., a corporation of Illinois Application May 27, 1954, Serial No. 432,685

8 Claims. (Cl. 340—258)

This invention relates generally to alarm systems for indicating the presence of fire and/or intruders, and more particularly to improved apparatus for detecting activity of certain predetermined types within a selected area.

Many forms of electronic object detectors have been proposed for determining the presence of an intruder, the presence of fire, or the like. These devices have not been entirely satisfactory as they have included complicated circuits and/or have not possessed the desired sensitivity and reliability. For example, in systems functioning through transmission and reception of sound energy, which may be of comparatively simple construction, it has been found difficult to provide a system sensitive to the opening of a door or a window in a room, or responsive to the presence of fire, which is not also operated by normal room functions such as air conditioning equipment, or the like. Furthermore, the prior art object and activity detection devices have not been satisfactory in regard to indicating system failure and to providing simplified checking of the system for proper operation.

Accordingly, it is an object of the present invention to provide an improved and simple object motion indicating system, which system is responsive only to certain activity within a selected area but is not responsive to other types of activity.

Another object is to provide a simple and improved electronic object motion indicating device to give a remote indication of certain physical activity within a selected area and to provide facilities for checking the proper operation of the entire device from the remote point to forestall undetected failure in the system.

A further object of the invention is to provide an improved ultrasonic object and activity detector including transmitting and receiving apparatus as well as remote indicating apparatus which indicates through transmission and reception of ultrasonic waves physical motion within a protected area and automatically registers failure in the system when a part of it fails, e. g. when the transmitted signal does not reach the receiver.

Still another object of the invention is to provide improved activity detecting apparatus utilizing ultrasonic waves and providing a remote indication, wherein proper operation of most of the apparatus is continually checked with failure being indicated at the remote point, and the entire apparatus may be periodically tested for proper operation from the remote point.

A feature of the invention is the provision of a system for indicating physical activity within a selected area including an ultrasonic wave signal receiver responsive to a signal from an associated transmitter and having a frequency selective device incorporated therewith so as to be responsive to only certain frequencies of the amplitude changes caused by activity within the selected area.

A further feature is the provision of an object detection system including an amplitude modulation receiver which is responsive to a signal from an associated transmitter of a high audio frequency signal, which receiver incorporates a narrow band electromechanical filter for producing a line of indication only when activity within a protected area causes amplitude variations in the received signal at the frequency to which the filter is responsive.

Another feature of the invention is the provision of a system for indicating physical activity within an enclosed space as described in the preceding paragraph with an oscillator included in the receiver to modulate the received transmitter signal at a selected frequency and a circuit responsive to the demodulated oscillator signal, with a remote indicating device operative to indicate activity in the space and also operative to indicate absence of this demodulated oscillator signal thereby showing failure of the system.

Still another feature of the invention is the provision of a system for indicating object activity within a space including a transmitter and receiver, and in which the receiver includes frequency selecting means, with a test oscillator being incorporated in the receiver which is selectively operative at first and second frequencies controlled from a remote indicating position. The oscillator operates at the first frequency to continually test the transmitter and the receiver, and at the second frequency, which corresponds to the pass band of the frequency selecting means, for remote testing of the entire alarm system.

Further objects, features and the attending advantages of the invention will be apparent upon consideration of the following description when taken in conjunction with the accompanying drawings in which:

Fig. 1 is a diagram of a room in which the detector has been installed;

Fig. 2 is a graph representing the comparative frequency effects of commonly encountered objects;

Fig. 3 is a block diagram of the receiving and indicating apparatus;

Figure 4:
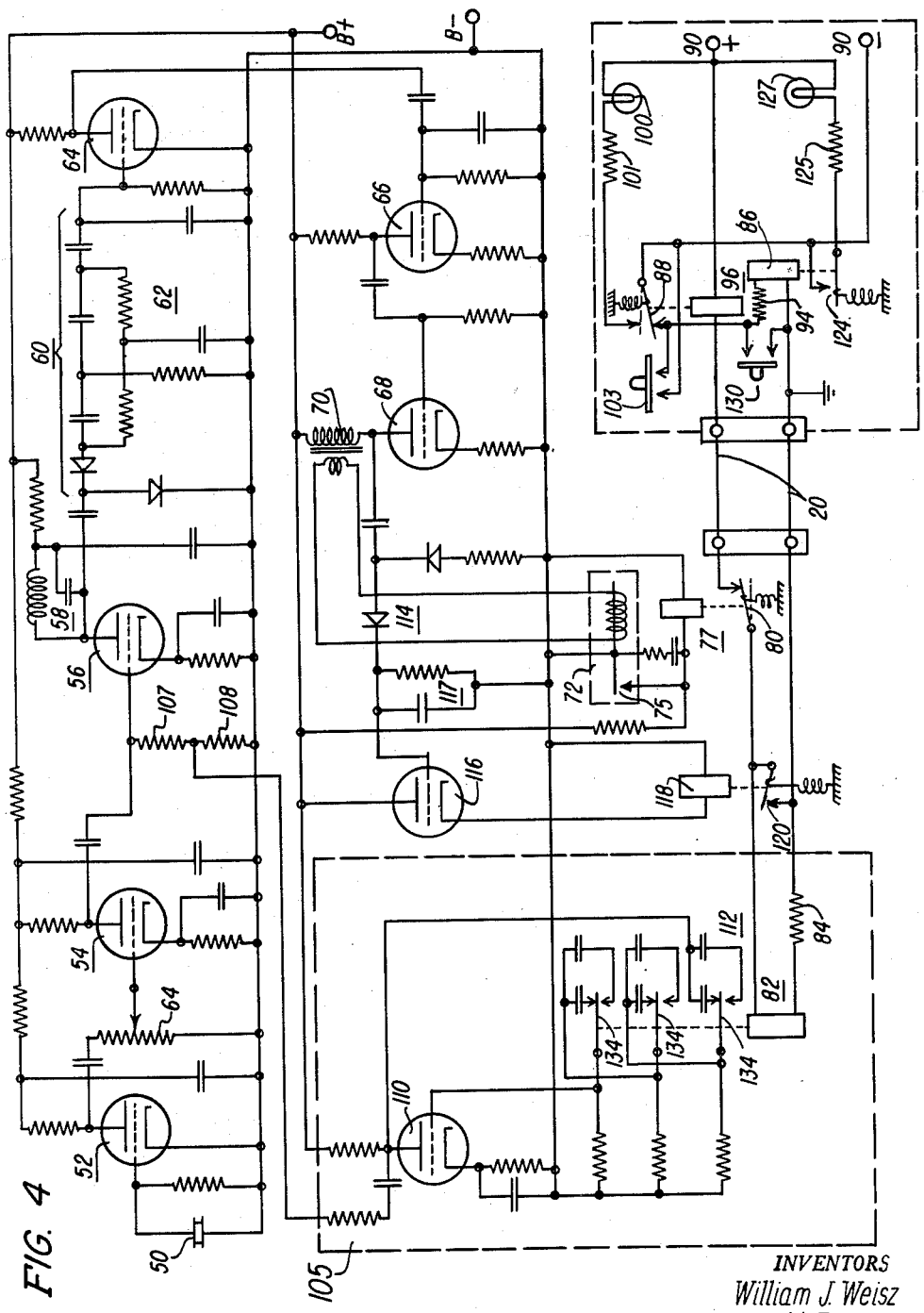
Fig. 4 is a schematic diagram of the apparatus of Fig. 3.

In practicing the invention there is provided an electronic object and activity detection system which gives a remote indication that certain types of activity are occurring within a selected or protected area. The device includes a transmitter and receiver of ultrasonic or high audio frequency waves and a remote indicator which is operated by the receiver when the signal received thereby contains a certain type of modulation. Amplitude modulation of the waves transmitted by the transmitter is detected by the receiver and amplified, and then applied to a frequency selective circuit which actuates the indicating means if the demodulated signal is of the proper frequency. Since movement of only certain objects produces the proper frequency the remote indicator is operated to alarm condition only when such movement takes place in the protected area.

For checking the system there is included with the receiving apparatus an oscillator coupled thereto which generates a test signal to modulate the continually received waves from the transmitter at a frequency to which the frequency selective circuit is not responsive. A circuit is provided which is responsive to the demodulated test signal and which operates in the absence of this signal to indicate failure of the transmitter or of the receiver. This same oscillator is further controllable from the remote indicator to produce a signal of second frequency for modulating the continually received waves from the transmitter. This signal is at the frequency to which the selective circuit is responsive so that the presence thereof at the output of the selective circuit produces a remote indication which tests proper operation of the entire system.

Referring now to Fig. 1, there is illustrated a room in which the detection system has been installed. The transmitter 10 is shown coupled to electromechanical transducers 12 and 14 in one portion of the room, while in a second portion of the room the receiver 16 and its associated transducer 18 are installed. Of course the transmitter and receiver and associated transducers may be hidden or disguised so as to be unobtrusive and to prevent discovery of the detecting system. From the receiver 16 a remote connecting line 20 is coupled to the remote indicator 22 which may be located at any distant point and serves to operate a suitable alarm and also provides control for test of the system.

The transmitter 10 is designed to produce an ultrasonic or high frequency audio signal which may be of the order of 20.5 kilocycles and and which serves as a carrier wave. The transmitted wave will be absorbed and reflected within the room with the result that components of the wave will reach the transducer 18 through a plurality of different paths. The various components will have different amplitudes and phases depending upon the attenuation thereof and the length of the various paths, and will be combined to provide a combined signal at transducer 18 having an amplitude depending upon the amplitude and phase of the various components. Accordingly, when there has been physical movement of an object (including air) within the room, the paths for the wave components will change and there will be a change in the signal intercepted by the transducer 18. The mere presence or absence of an object in the room will affect the phase and amplitude of the received signal due to the reflection and absorption characteristics thereof and because the object may interrupt the direct path of the transmitted signal. Furthermore, when an object is in motion within the room, changes in the frequency of the carrier signal as received by the transducer 18 will occur due to the Doppler effect. Accordingly, motion of objects, and disturbances of the air within the selected area produce amplitude modulation of the transmitted carrier signal as it is received by the transducer 18. The actual energy intercepted thereby may consist of an amplitude modulated signal at the frequency transmitted by the transmitter 10 as well as amplitude modulated waves of other frequencies which are produced by the Doppler effect when object motion occurs within the area of influence of the transmitted signal.

Fig. 2 is a graph illustrating the characteristics of the modulation of the carrier signal which is produced by motion of certain objects in the protected space. It may be seen that a walking person would produce relatively high amplitude modulation at a frequency in the 100 cycle region, while a fire would produce somewhat less amplitude modulation at a frequency largely in the area of 75 cycles. On the other hand, the modulation of the carrier signal produced by air conditioning equipment is of considerably less amplitude and has the greatest amplitude occurring below 60 cycles per second. Of course it is desired to detect the presence of fire or the walking person while it is generally not desired to detect air movement resulting from the operation of such common and innocuous equipment as heating systems, air conditioning apparatus or the like.

The block diagram of Fig. 3 illustrates the receiving apparatus of the present invention which is designed to operate as described above. Included are the transducer or pick-up device 18 which is coupled to an ultrasonic carrier wave amplifier 26 which may consist of a suitable number of amplifying stages. The received signal is then applied to the amplitude modulation detector 28 after which the detected signal is applied to the frequency selective amplifier 30. The amplifier 30 is designed to be sharply responsive to a signal or signals in the area of 70–100 cycles, and when the demodulated wave consists of a signal in this area, a voltage is applied to energize the control circuit 32 which gives a suitable indication at the remote indicator 22. The frequency selective amplifier 30 is designed to take advantage of the increased amplitude of the modulation of the carrier wave signal to which response is desired as well as for the frequency of the signal. Therefore the remote indicating apparatus 22 will not be energized to alarm when air conditioning equipment 36 begins operation (Fig. 1).

In order to check for proper operation of the system there is incorporated in the receiving apparatus failure detection equipment which indicates at and is operable from the remote indicator 22. Oscillator 40 is coupled to the carrier amplifier 26 and provides a test signal, which may be of the order of 300 cycles, to this amplifier. This 300 cycle test signal will then amplitude modulate the carrier wave signal in the amplifier 26 which has been intercepted by transducer 18 from the transmitter 10. The test signal is demodulated by the detector 28 and applied to the rectifier stage 42 which is operable in the absence of this signal to give an indication through the control circuit 32 at the remote indicator 22. Therefore, should the transmitted signal no longer appear at the receiver rectifier due to any cause, such as failure of the transmitter or of the receiver up to this stage, a warning indication would be given at the remote indicating point.

The oscillator 40 may also be used to test the entire system. Through operation of a device at the remote indicating station it is possible to change the frequency of the output signal of the oscillator 40 to approximately 100 cycles. This 100 cycle signal will then modulate the received carrier signal and be conducted through the receiver to operate the control circuit 32 which would cause response of the remote indicator 22 in the same manner as would a signal caused by detection of an object. Therefore, complete testing of the system is possible from the remote indicating point, since failure of any component would prevent the indication expected due to the operation initiated at the remote point.

Turning now to Fig. 4, the particular circuit of the receiver 16 and remote indicator 22 will be described. Crystal transducer 50 is connected to the input of a carrier wave amplifier including electron discharge valves 52, 54 and 56. The carrier amplifier increases the level of the intercepted signal to the proper level to provide efficient detection. In order to eliminate introduction of unwanted signals into the system, a tuned circuit 58 is incorporated in the output circuit of valve 56. This tuned circuit is resonant at the frequency of the carrier signal, which may be of the order of 20.5 kilocycles and will reject audio signals of other frequencies to prevent operation of the system by such signals. Different amounts of the signal may be tapped from resistor 64 to adjust the amount of the carrier wave applied to valve 54. Coupled to the output of the carrier wave amplifier is the detector circuit 60. This circuit is shown as a voltage doubling system to provide an output of increased amplitude. A bridged T filter network 62 removes the 20.5 kilocycle carrier wave so that only the amplitude modulation of this wave will appear at the output of the detector circuit 60.

The demodulated audio signal is then applied to a low frequency amplifier circuit including electron discharge valves 64, 66 and 68. The output signal from valve 68 is applied to output transformer 70, the secondary winding of which is coupled to an electromechanical frequency selective device 72. The device 72 is constructed to be sharply responsive to a signal above a certain amplitude in the frequency range of 70 to 100 cycles for the reasons previously described and includes a switch 75 which is repeatedly operated during response of the device. The switch 75 is connected across the coil of relay 77 which is normally energized so that operation of the frequency selective device 72 will intermittently short this coil and thereby de-energize the relay. Contacts 80 of the relay are normally closed when the relay is energized and maintain a completed circuit through the remote connecting line 20, the coil of relay 82, and resistor 84. The line 20 is connected to the remote unit 22 and the circuit is completed through the coil of relay 86, resistor 94, the solid line position of relay contacts 88, the potential supply 90, and the coil of relay 96.

The construction of the relays 82 and 86 is such that the current flowing through the coils thereof in the circuit as just described will be insufficient to operate the contacts thereof. However, relay 96 will maintain contacts 88 in the solid line position by means of this current. Therefore, when contacts 80 are open, the remote circuit through line 20 to the indicator 22 will be broken to de-energize relay 96 located there. In this condition the dotted line position of contacts 88 is established and completes the circuit to the alarm light 100 through resistor 101. It may be seen that the lighting of this light then gives an indication that amplitude modulation of the carrier wave signal at a frequency of 100 cycles has occurred. This as previously explained, occurs when object activity of the desired type is taking place in the field of the carrier wave signal.

While the duration of the amplitude modulation causing operation of switch 75 may be short and therefore contacts 80 may be opened only momentarily, the remote line connection 20 is broken by contacts 88 so that the alarm light 100 will remain energized until the reset switch 103 is operated. Closing this switch will complete the circuit across the now open contacts of the solid line position of contacts 88 which will again energize the relay 96 and move contacts 88 to the solid line position if switch 75 is not operated at the time.

Turning now to the failure detection circuit incorporated in the system, attention is directed to the resistor-capacitor oscillator 105 with its output connected to the junction of resistors 107 and 108 in the input circuit of valve 56 of the carrier wave amplifier. The oscillator 105 includes electron discharge device 110 and the frequency determining network 112 which includes the values necessary to produce a test signal of the order of 300 cycles. The oscillator then will apply the test signal to the receiver which will modulate the 20.5 kilocycle waves received from the transmitter. The modulated wave is detected in the receiver and the detected test signal is then amplified. This detected signal will not cause operation of the frequency selective device 72 but will, however, be applied to the voltage doubler rectifier circuit 114 where it is rectified and coupled to electron discharge valve 116 as a positive bias. Resistor-capacitor combination 117 has a long time constant so that slight momentary loss of the carrier signal will not cause failure indication.

Connected in the cathode circuit of valve 116 is the coil of relay 118, which will be energized when this valve is conducting. When relay 118 is energized, the contacts 120 associated therewith will remain open. Therefore, if for any reason the 300 cycle test signal does not modulate, the carrier wave signal and/or is not detected to appear at the rectifier 114, the positive bias will no longer be developed thereby and the current in valve 116 will be reduced to a value sufficient to cause deactuation of relay 118. When the valve 116 no longer conducts, the relay 118 will be deactuated, and contacts 120 will be closed which shorts the coil of relay 82 and the resistor 84. With these two components short-circuited, there will be an increase in the current flowing in the remote line 20 of sufficient value to operate contacts 124 associated with relay 86. Closing of contacts 124 places potential supply 90 across resistor 125 and the failure indication lamp 127, thus informing an operator that the system is not functioning properly. Whenever the difficulty has been remedied, the valve 116 will again conduct to energize relay 118 and open contacts 120 which will cause release of contact 124.

A further purpose for the oscillator 105 is in providing a test signal to test the operation of the alarm portion of the receiver. In order to carry out such a check, the test switch 130 is closed which shorts resistor 94 and the coil of relay 86 to increase the current in the remote line 20 to a sufficient degree to operate relay 82 and the contacts 134 associated therewith. Operating the contacts 134 alters the constants in the resistor-capacitor network 112 to change the frequency of the signal produced by oscillator 105. Thus a signal of different frequency is applied to valve 56. The values of the components in network 112 are such that the signal now produced is the one to which the frequency selective device 72 is responsive or 100 cycles in the case stated. This oscillator signal will then modulate the carrier wave at 100 cycles, which signal is detected and amplified and applied to the device 72. As the device 72 responds to the frequency applied it will operate the switch 75. Therefore, the remote line 20 will be open and contacts 88 will move to the dotted line position to light the alarm lamp 100 indicating that the system is in proper working order. Release of switch 130 will cause reduction of the current in line 20 and deactuation of relay 82 to place the system in proper condition for detection again.

Figure 5:
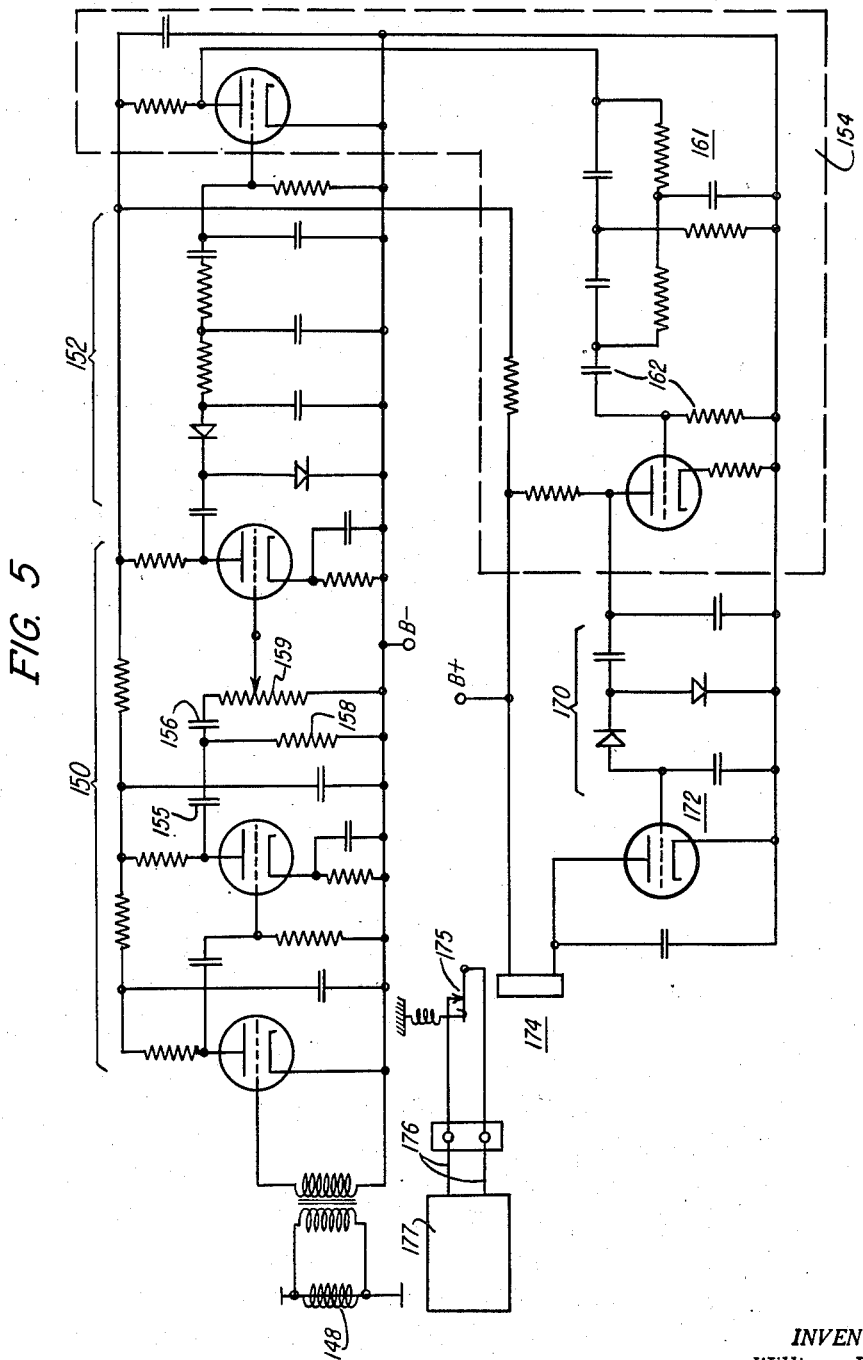
Fig. 5 is a schematic diagram of an additional embodiment of the receiving apparatus.

The circuit shown in Fig. 5 is a further embodiment of the receiver of the invention. The carrier wave amplifier 150 is coupled between a suitable pick-up such as magnetostrictive transducer 148 and amplitude modulation detector 152 which applies a detected signal to the selective audio amplifier 154. Amplifier 150 includes a high pass filter comprised of capacitors 155 and 156 and resistors 158 and 159. The function of this filter is to prevent entry of spurious audio signals into the system and therefore to forestall a false alarm. Audio amplifier 154 includes a bridged T filter network 161 and a high pass filter network 162 with proper characteristics to greatly attenuate signals belows 70 cycles. The output of amplifier 154 is coupled to a voltage doubler rectifier 170 which will render the signal passed by selective audio amplifier 154 a direct current bias to control valve 172. Relay 174 is connected in the output circuit of valve 172 and is controlled by the conduction condition thereof. Therefore it may be seen that relay 174 will be operated in response to the application of a rectified signal of the proper frequency and sufficient amplitude to valve 172 and will operate associated contacts 175 to open the connecting line 176 and produce an indication at remote station 177. By the addition of further filters, an oscillator, rectifier and control circuit such as shown in Fig. 4, failure indication and remote testing may also be provided in conjunction with the circuit of Fig. 5.

The described invention therefore provides a very satisfactory object motion or fire detector which is able to distinguish between types of motion and activity for which an alarm indication is desired and those for which such indication is not desired. Not only may a remote alarm be given in response to the predetermined activity in a protected area but an additional circuit may be incorporated in the system to provide an automatic indication at the remote position when a portion thereof has failed. This circuit may also include provision for complete testing of the system from the remote position to establish that modulation of the carrier signal in the selected frequency range will produce an alarm indication. Accordingly, the system presents relatively simple apparatus suitable for detection of intruders, fire, movement of objects within a given area and the like, which has been found to be highly dependable.

While particular embodiments of the invention have been shown and described which are illustrative thereof, changes may be made and it is intended to cover all such changes and modification, including the use of carrier signals of other frequencies, which fall within the scope of the invention as defined in the appended claims.

What is claimed is:

1. A detection system for indicating object motion in space according to the extent at which the same amplitude modulates a carrier wave in a predetermined frequency range, said system including in combination, means for radiating a carrier wave into the space, receiver means for intercepting the carrier wave, oscillator means coupled to said receiver means and operative to modulate the intercepted carrier wave at a selected frequency outside the predetermined frequency range, detecting means coupled to said receiver means to demodulate amplitude variations of the carrier signal and produce an indicating signal, first circuit means coupled to said detecting means and responsive only to a detected signal in the predetermined frequency range, second circuit means coupled to said detecting means and responsive to a detected signal of said selected frequency, an alarm circuit including first and second switch means therein, said first switch means being coupled to and operated by response of said first circuit means, said second switch means being coupled to and operated by response of said second circuit means, whereby said alarm circuit indicates both the certain object motion to be detected and failure of said means for radiating a carrier wave, said receiver means and said detecting means.

2. The detection system of claim 1 wherein said oscillator means is adapted to be adjusted to produce a signal within the predetermined frequency range to operate said first switch means and actuate said alarm circuit indicating proper operation of said system.

3. Apparatus for detecting certain motion in space including in combination, a source of sound energy for supplying a sound signal of selected frequency in the space and establishing a sound wave pattern therein, a sound signal receiver including first circuit means adapted to intercept the sound signal, means for amplifying the intercepted signal, and means for detecting amplitude modulation of the amplified signal, selective filter means coupled to said detecting means of said receiver and responsive only to a detected signal of a first frequency, indicator means coupled to said selective filter means and operated by response thereof, oscillator means operative to produce a signal of second frequency different from said first frequency and coupled to said receiver to modulate the sound signal received therein, and second circuit means responsive to a signal of said second frequency coupled to said amplitude detecting means of said receiver, said second circuit means being connected to said indicator means for operating the same in the absence of a signal of said second frequency, whereby said indicator means indicates the presence of certain objects and motion in the space, and also failure of said sound energy source and said sound signal receiver.

4. Apparatus for detecting selected movements in a certain area including in combination, means for radiating waves of a predetermined ultrasonic frequency within the area, means for receiving the radiated waves including, amplifier means for amplifying waves of said predetermined frequency, modulating means coupled to said amplifier means to amplitude modulate the waves of said predetermined frequency at a first frequency, demodulator means for detecting amplitude modulation of the waves, frequency selective means coupled to said demodulator means for selecting detected amplitude modulation signals within a particular frequency range including said first frequency, first relay means coupled to and operated by said frequency selective means, second relay means adapted to operate said modulating means, and a remote station coupled to said first and second relay means and adapted to indicate operation of said first means thereby indicating selected movements in the area which modulate the radiated waves in said particular frequency range, said remote station further adapted to operate said second relay means whereby said modulating means provides a signal of first frequency causing operation of said first relay means to test said apparatus.

5. Apparatus for detecting selected movements in a protected area, said apparatus including in combination, means for radiating waves of a predetermined frequency within the area, means for receiving the radiated waves including, amplifier means for selectively amplifying waves of said predetermined frequency, oscillator circuit means coupled to said amplifier means operative to produce a signal of first frequency and alterable to produce a signal of second frequency for modulating said waves of predetermined frequency, demodulator means for detecting amplitude modulation of said waves, a frequency selective circuit coupled to said demodulator means for selecting detected signals within a particular frequency range including said second frequency and excluding said first frequency, a second circuit coupled to said demodulator means and energized by detected signals of said first frequency, first relay means coupled to and operated by said frequency selective circuit, second relay means adapted to alter said oscillator circuit means to produce a signal of said second frequency, third relay means adapted to be operated by said second circuit in the absence of a signal of said first frequency, and a closed current conducting circuit coupled to said first, second and third relay means, said current conducting circuit adapted to open upon operation of said first relay means thereby indicating selected movements in the protected area which modulate the radiated waves in said particular frequency range, said current conducting circuit being adapted to provide increased current upon operation of said third relay means thereby indicating failure in said apparatus, and said current conducting circuit being further adapted to actuate said second relay means whereby said oscillator means produces a signal of said second frequency causing operation of said first relay means to test said apparatus.

6. An alarm system for indicating at a remote point certain object motion in a substantially enclosed space, and which provides facility for testing proper operation of the system from the remote point, said system including in combination, means for transmitting carrier waves into the space, receiver means for receiving said waves and detecting amplitude modulation thereof, said receiver means including a first frequency selective network responsive to detected variations in a predetermined frequency range resulting from the certain object movement, first switch means operated by response of said first frequency network, two condition modulating means coupled to said receiver means and normally operative in one condition to amplitude modulate the received wave signal at a first frequency outside said predetermined frequency range, second switch means coupled to said modulating means and operative to change said modulating means for operation in a second condition to amplitude modulate the received wave signal at a second frequency within said predetermined frequency range, a network responsive to detected variations at said first frequency, said network including third switch means operated in the absence of modulation at said first frequency, a remote indicating and testing station, and a single circuit connecting said remote station to said first, second and third switch means, said first switch means opening said circuit to indicate the certain object motion in the space, said third switch means applying increased current to said circuit to indicate failure of said transmitter and receiver, said remote station including means for applying increased current to said circuit for operating said second switch means to apply said second frequency to said receiver means to cause operation of said first switch means and thereby test the operation of the system.

7. In apparatus for detecting object movement in a substantially closed space which apparatus includes a source of sound wave energy for transmitting a carrier signal of selected frequency and establishing a wave signal pattern in the space, the carrier signal being of the form which may be modulated by object motion so that motion of an object it is desired to detect produces amplitude modulation within a certain frequency band with a maximum amplitude at a first frequency and motion of an object it is desired not to detect produces amplitude modulation within such certain frequency band with a maximum at a second frequency removed from said first frequency, the signal receiver for such apparatus including in combination, microphone means disposed in the space to intercept the carrier signal, amplifier means coupled to said microphone means for increasing the amplitude of the signal, a detector coupled to said amplifier means to derive amplitude modulation of the carrier signal caused by object motion, frequency selective means coupled to said detector, said frequency selective means being sharply responsive to demodulated signals of given amplitude in the region of said first frequency and outside of the region of said second frequency, and means responsive to said frequency selective means to be operated thereby and indicate motion of an object it is desired to detect within the space.

8. Apparatus for detecting object motion in a substantially closed space including in combination, a source of sound wave energy for transmitting a carrier signal of high audio frequency and establishing a wave signal pattern in the space, said carrier signal being of the type which may be amplitude modulated by object motion so that motion of an object it is desired to detect produces amplitude modulation within a certain frequency band with a maximum amplitude in the region of a first frequency and motion of an object it is desired not to detect produces amplitude modulation within such certain frequency band with a maximum amplitude in the region of a second frequency removed from said first frequency, and a receiver for such apparatus including microphone means to intercept the carrier signal, amplifier means connected to said microphone means for increasing the amplitude of the signal, an amplitude modulation detector coupled to said amplifier means to derive amplitude modulation of said carrier signal caused by object motion, an electromechanical filter coupled to said detector, said filter being sharply frequency responsive in the region of said first frequency and outside of the region of said second frequency, and means responsive to operation of said filter to be operated thereby and indicate motion of objects it is desired to detect in the space.

References Cited in the file of this patent

UNITED STATES PATENTS

| | | |
|---|---|---|
| 2,615,970 | Bagno | Oct. 28, 1952 |
| 2,646,556 | Allen | July 21, 1953 |
| 2,655,645 | Bagno | Oct. 13, 1953 |
| 2,690,477 | Friedmann et al. | Sept. 28, 1954 |